United States Patent [19]

Koprowicz et al.

[11] Patent Number: 5,041,492

[45] Date of Patent: Aug. 20, 1991

[54] HOT MELT ADHESIVE

[75] Inventors: George Koprowicz, Canton, Mich.; Patrick Czaplewski, West Allis; Michael Kaczkowski, Milwaukee, both of Wis.

[73] Assignee: Findley Adhesives, Inc., Wauwatosa, Wis.

[21] Appl. No.: 482,472

[22] Filed: Feb. 21, 1990

[51] Int. Cl.5 .................. C08L 23/18; C08L 23/16; C08L 23/04

[52] U.S. Cl. ................................ 524/274; 524/271; 524/487; 524/489

[58] Field of Search ............ 524/487, 489, 271, 274

[56] References Cited

U.S. PATENT DOCUMENTS

| | | | |
|---|---|---|---|
| 3,798,118 | 3/1974 | Jones | 524/274 |
| 4,072,735 | 2/1978 | Ardemagni | 524/274 |
| 4,302,371 | 11/1981 | Matsuo et al. | 524/274 |
| 4,618,640 | 10/1986 | Tsuchida et al. | 524/271 |
| 4,701,489 | 10/1987 | Hughes et al. | 524/349 |
| 4,749,739 | 6/1988 | Foster et al. | 524/274 |
| 4,761,450 | 8/1988 | Lakshmanan et al. | 524/488 |
| 4,886,853 | 12/1989 | Foster et al. | 524/487 |

OTHER PUBLICATIONS

Hüls Aktiengesellschaft Vestoplast 1988 brochure.

Primary Examiner—Lewis T. Jacobs
Attorney, Agent, or Firm—Godfrey & Kahn, S.C.

[57] ABSTRACT

Hot melt adhesive compositions for bonding rigid polypropylene substrates comprise intimate blends of an amorphous copolyolefin copolymer, a polyolefin wax, a rosin-based ester resin and a polybutylene copolymer.

6 Claims, No Drawings

HOT MELT ADHESIVE

FIELD OF THE INVENTION

The present invention relates to hot melt adhesives. More particularly, it relates to hot melt adhesives for bonding together rigid polypropylene substrates.

BACKGROUND OF THE INVENTION

The automotive industry is attempting to replace metal and other materials with plastics, such as rigid polypropylene, which are light and can be readily molded into complex shapes. However, the bonding of two parts or substrates of rigid polypropylene which is the preferred plastic does present problems.

It is generally believed that in order to develop an acceptable and effective bond between two substrates of rigid polypropylene a "pretreatment" of the substrates must first be effected. The pretreatment can consist of exposure to corona discharge/static discharge, flame pretreatments are not always safe, effective and efficient. In addition, they can also be time-consuming and decrease production rates as a consequence.

Certain automotive production lines have chosen to eliminate the pretreatment/adhesive process altogether and to bond the polypropylene substrates by ultrasonic welding. However, this method is expensive because of the relatively high reject rates of the sonically welded polypropylene parts. Furthermore, the purely mechanical bonds formed by sonic welding are not always effective.

It would be advantageous to have adhesive compositions for bonding polypropylene that eliminated the need for pretreatment of the substrate and the use of corona discharge equipment and chemical primers.

SUMMARY OF THE INVENTION

It is an object of the present invention to disclose hot melt or thermoplastic adhesive compositions which are capable of bonding rigid polypropylene substrates together without pretreatment of the substrates.

The adhesive compositions of the present invention comprise a blend of the following:
(a) about 20% to 35% by weight of an amorphous copolyolefin copolymer;
(b) about 5% to about 15% by weight of a polyolefin wax;
(c) about 20% to about 35% by weight of a rosin-based ester resin; and
(d) about 20% to about 35% by weight of a polybutylene copolymer.

The compositions of the present invention possess the following desirable properties:
(a) They are capable of extrusion application at conventional hot melt application temperatures of about 400° F. (205° C.);
(b) The adhesive compositions have a 60 second open time at about 400° F. (205° C.), a recommended application temperature;
(c) They are capable of maintaining an acceptable bond over a wide temperature range of from about 160° F. (71° C.) to about −20° F. (−29° C.);
(d) The adhesive compositions have a ring and ball melting point of about 296° F. (147° C.) to about 300° F. (149° C.);
(e) The solidified adhesive compositions have a tensile strength (ASTM D 412) of about 300 psi at 77° F. (25° C.); and
(f) The solidified adhesive composition have an elongation of 400% (ASTM D 412) at 77° F. (25° C.).

DESCRIPTION OF THE PREFERRED EMBODIMENT

The preferred adhesive compositions contain about 25% to about 30% by weight of an amorphous copolyolefin copolymer; about 0.4% to about 1.0% of an antioxidant/stabilizer; about 10% by weight of a polyolefin wax; about 25% to about 30% of a rosin-based ester resin and about 25% to about 30% by weight of a polybutylene copolymer.

The amorphous copolyolefin copolymer component of the compositions present invention is a copolymer based on repeating units of ethylene, propylene and butene. They may be comprised of alternating repeating units of the following monomer combinations:
(a) Ethylene and propylene
(b) Ethylene and butene
(c) Propylene and butene
(d) Ethylene, propylene and butene Suitable copolymers are commercially available from Huls America under the trade name "Vestoplast." Those with a softening point of about 300° F. (149° C.) are preferred. It will be recognized that mixtures of any of the above copolymers also may be used as base components in the compositions of the present invention.

The preferred antioxidant/stabilizer component is tetrakis (methylene (3,5-di-tert-butyl-4-hydroxyhydrocinnamate)) methane. This material is available from Ciba-Geigy under the trade name Irganox 1010.

These stabilizers-antioxidants also are known as hindered phenols. Representative hindered phenols include: 1,3,5-tri-methyl-2,4,6, tris (3,5-tert-butyl-4-hydroxy benzyl) benzene; pentaerythritol tetrakis-3 (3,5-di-tert-butyl-4-hydroxyphenyl) propionate; 4,4'-methylene bis (4-methyl-6-tert-butyl phenol); 6-(4-hydroxyphenoxyl-2,4-bis (n-octylthio)-1,3,5-triazine; 2,4,6-tris (4-hydroxy-3,5-di-tert-butyl-phenoxy)-1,3,5-triazine; di-n-octa-decyl-3,5-di-tert-butyl-4-hydroxy benzyl-phosphonate; 2-(n-octylthio) ethyl-3,5-di-tert-butyl-4 hydroxy-benzoate; sorbitol hexa-(3, (3,5-di-tert-butyl-4-hydroxy-phenyl) propionate and pentaerythritol tetrakis-3, (3,5-di-tert-butyl-4 hydroxyphenyl) propionate.

The polyolefin wax component is used in the hot melt adhesive compositions of the present invention to reduce the open time of the material without effecting the temperature performance. As used herein, the term "polyolefin wax" refers to those polymeric or long-chain entities comprised of olefinic monomer units. These materials are commercially available from Eastman Chemical Co. under the trade name "Epolene." The materials which are preferred for use in the compositions of the present invention have a ring ball softening point of 300° F. (149° C.) to 325° F. (163° C.).

The rosin based ester resins which are used in the hot melt adhesive compositions of the present invention extend the adhesive properties and improve the specific adhesion of the amorphous copolyolefin copolymer and the polybutylene copolymer. As used herein, the term "rosin based ester resin" preferentially refers to glycerol and pentaerythritol esters of natural and modified rosins, such as, for example, the glycerol ester of pale wood rosin, the pentaerythritol ester of tall oil rosin and the phenolic modified pentaerythritol ester of rosin. Mixtures of two or more of the above described rosin based ester resins may be preferred for some formulations—especially preferred are the wood rosins. The preferred materials are available from Hercules, Inc. under the trade name "Forel." They preferably have a softening point of 85° C. (185° F.) to 105° C. (221° F.).

The polybutylene copolymer component is used in the thermoplastic hot melt adhesive of the present invention to enhance the strength of the adhesive bond of the material at elevated temperatures. As used herein, the term "polybutylene copolymer" refers to those polymeric entities comprised of ethylene and butene monomers where the butene monomeric unit comprises at least 89% of the copolymer. These are available from the Shell Chemical Co. under the trade name "Duraflex." The preferred materials have a ring and ball softening point of approximately 150° C. (302° F.).

A metal deactivator may also be employed to enhance the stability of the present invention. The preferred metal deactivator is 1,2 bis (3,5-di-tert-butylhydrohydroxy-cinnamoyl) hydrazine. This material is available from Ciba-Geigy under the trade name Irganox MD-1024.

The hot melt adhesive composition of the present invention may be formulated using the techniques well known to those skilled in the art.

The preferred process involves using a hot oil jacket/mantle/vessel combination combined with a turbine shaft type mixer. The jacket/mantle should be capable of maintaining the adhesive mixture at about 350° F. (177° C.) throughout the mixture. It is recommended that the batch be blanketed with CO2 gas throughout the entire process operation.

The mixing vessel is preferably preheated to a temperature of about 325° F. (163° C.) to about 375° F. (191° C.). When ready, it is charged with the amorphous copolyolefin copolymer and the antioxidant/stabilizer and blanketed with the carbon dioxide gas at a low flow rate (i.e., ½ cc/min). When the first two components are completely molten, the stirring is begun at a moderate rate—the temperature of the components at this point should be at least 325° F. Next, the polyolefin wax is added and blended into the mixture until it is homogeneous. The temperature is still maintained at about 325° F. Then the rosin based ester resin component is added while maintaining the batch temperature in the range of about 325° F. to about 350° F.

The molten mixture is allowed to equilibrate at 350° F. and the polybutylene copolymer is added at a rate which does not induce excessive cooling. The stirring action is continued beyond the solvation of polybutylene copolymer into the molten mixture and a vacuum is preferably applied to remove all entrapped air. The molten composition is packaged at a temperature of about 350° F.

The viscosity of the preferred hot melt adhesive compositions at 350° F. is about 18500 centipoise to bout 20000 centipoise as determined by a Brookfield RVT viscometer, equipped with a Brookfield Thermosel (spindle #27, 10 RPM). The viscosity at 400° F. is about 10000 centipoise to about 11000 centipoise as determined using the same equipment and conditions. The ring and ball melting point of the preferred compositions are from about 296° F. to about 300° F. The tensile strength (ASTM D 412) of the solidified adhesive is about 300 psi at 77° F. and it has an elongation of about 400%. The density of the preferred composition is about 0.91 grams per cubic centimeter at 77° F.

The preferred composition when applied as a hot melt to rigid polypropylene substrates which have not been pretreated form good strong useful bonds. Typical lap shear values for the adhesive when applied to a standard polypropylene substrate (i.e., Complas 293B) are as follows:

Ambient = 100 psi
160° F. = 20 psi
(−30° F.) = 14 psi

The practice of the invention is further illustrated by the example which follows:

EXAMPLE

A hot melt adhesive was prepared containing the following ingredients:

Amorphous Copolyolefin Copolymer (VESTOPLAST 708): 30.13%
Polyolefin Wax (EPOLENE N-15): 9.17%
Rosin-Based Ester Resin (FLORAL 85): 30.13%
Polybutylene Copolymer (POLYBUTYLENE DP 8510): 30.13%
Antioxidant/Stabilizer (IRGANOX 1010): 0.42%

The ingredients were blended in a hot oil jacket/mantle/vessel combination that was preheated to about 325° F. It was first charged with the amorphous copolyolefin copolymer and the antioxidant stabilizer and blanketed with $CO_2$ at the flow rate of ½ cc/minute. When the contents were completely molten they were stirred and the polyolefin wax added. The rosin-based resin was then added while maintaining the temperature at about 325° F. Next the polybutylene copolymer was added slowly so as to not induce excessive cooling and the mixture was stirred until it was uniform. A vacuum was then applied to remove all entrapped air and the molten composition packaged at 350° F. and allowed to cool.

To evaluate the properties of the composition it was applied as a hot melt adhesive by extrusion to the junction of two rigid polypropylene sheets (Complas 293B) that had not been pretreated. Upon cooling the lap shear value of the bond which formed was tested and found to be much superior to the bonds formed with conventional hot melt adhesives.

It will be apparent to those skilled in the art that the foregoing example has been made for the purpose of illustration and that variations may be made in proportions, procedures and materials without departing from the scope of the present invention. Therefore, it is intended that the invention not be limited except by the claims which follow.

What is claimed is:

1. A hot melt adhesive composition for bonding polypropylene substrates, said composition comprising:
   (a) about 20% to abut 35% by weight of an amorphous copolyolefin copolymer;
   (b) about 5% to about 15% by weight of a polyolefin wax;
   (c) about 20% to about 35% by weight of a rosin-based ester resin; and
   (d) about 20% to about 35% by weight of a polybutylene copolymer.

2. A composition of claim 1 wherein the amorphous copolyolefin copolymer is selected from copolymers made up of the following combinations of alternating repeating monomeric units; ethylene and propylene;

ethylene and butene; propylene and butene; and ethylene, propylene and butene.

3. A composition of claim 1 which contains an antioxidant/stabilizer.

4. A composition of claim 1 wherein the polyolefin wax is a polymeric long chain entity comprised of repeating olefinic monomer units.

5. A composition of claim 1 wherein the rosin-based ester resin is selected from glycerol and pentaerythritol esters of natural and modified wood rosins.

6. A composition of claim 1 wherein the polybutylene copolymer component comprises about at least 89% butene monomeric units.

* * * * *

UNITED STATES PATENT AND TRADEMARK OFFICE
CERTIFICATE OF CORRECTION

PATENT NO. : 5,041,492

DATED : August 20, 1991

INVENTOR(S) : Koprowicz et al.

It is certified that error appears in the above—identified patent and that said Letters Patent is hereby corrected as shown below:

Column 1, Line 22, after the word "pretreatment" insert --or the use of chemical primers. These pretreatments--;

Column 3, Line 6, after the word "name", delete the word "Forel" and insert --Foral--;

Column 3, Line 59, after the words "centipoise to" delete the word "bout" and insert --about--;

Column 4, Line 57, after the words "20% to" delete the word "abut" and insert --about--.

Signed and Sealed this

Eighth Day of December, 1992

Attest:

DOUGLAS B. COMER

Attesting Officer

Acting Commissioner of Patents and Trademarks